United States Patent [19]

Kruger

[11] Patent Number: 4,459,666
[45] Date of Patent: Jul. 10, 1984

[54] PLURAL MICROCODE CONTROL MEMORY

[75] Inventor: Lawrence M. Kruger, Clifton Park, N.Y.

[73] Assignee: Control Data Corporation, Minneapolis, Minn.

[21] Appl. No.: 77,954

[22] Filed: Sep. 24, 1979

[51] Int. Cl.³ .......................... G06F 9/00; G06F 9/22
[52] U.S. Cl. .................................................. 364/200
[58] Field of Search ............................... 364/200, 900

[56] References Cited

U.S. PATENT DOCUMENTS

| | | | |
|---|---|---|---|
| 3,651,476 | 3/1972 | Metz et al. | 364/200 |
| 3,768,075 | 10/1973 | Reitsma et al. | 364/200 |
| 4,008,462 | 2/1977 | Kanda | 364/200 |
| 4,080,648 | 3/1978 | Asano et al. | 364/200 |
| 4,124,891 | 11/1978 | Weller et al. | 364/200 |
| 4,153,937 | 5/1979 | Poland | 364/200 |
| 4,156,279 | 5/1979 | Wilhite | 364/200 |

Primary Examiner—Gareth D. Shaw
Assistant Examiner—John G. Mills
Attorney, Agent, or Firm—William J. McGinnis, Jr.; J. A. Genovese

[57] ABSTRACT

A microcode control memory having a first memory for receiving initial instructions is shown in combination with at least one additional memory for executing multistep control functions in a computer system. The first memory receives all initial control instructions from an instruction stack and produces the appropriate control output. Simultaneously as part of the initial instruction, a memory select network receives a control bit so that an output select network connected to the output of all memories passes the output from the first memory to the output register. Single step instructions are processed continuously this way. Multistep instructions are performed by using a portion of the output from the first memory to serve as the address selection in one of the other memories. When a multistep instruction is completed, the output select network again selects the output from the first memory for gating to the output register. The memory select network provides a control for the selection of the output of the first or any other memory at the same time that the memory is generating an output from an input address.

5 Claims, 3 Drawing Figures

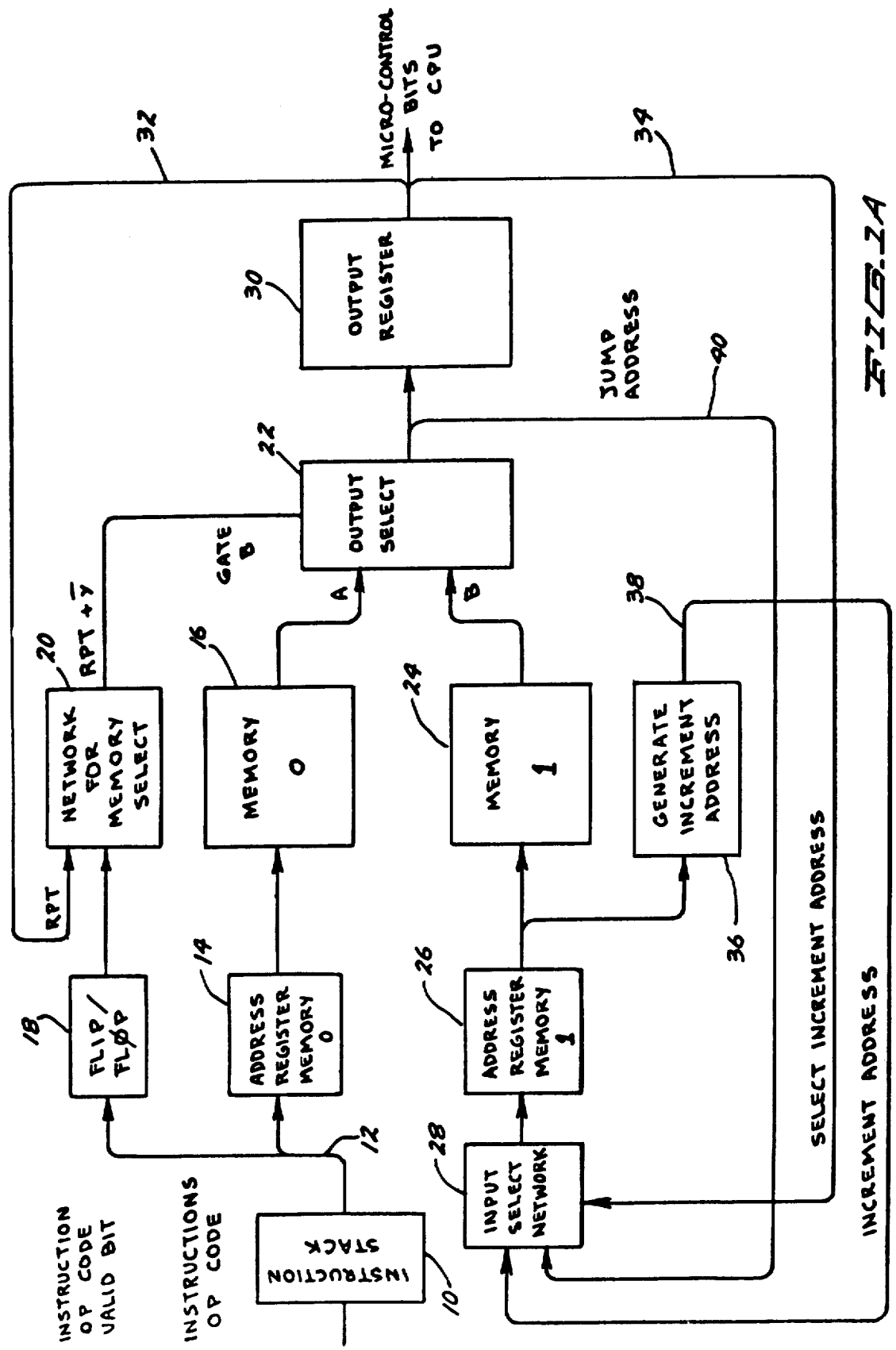

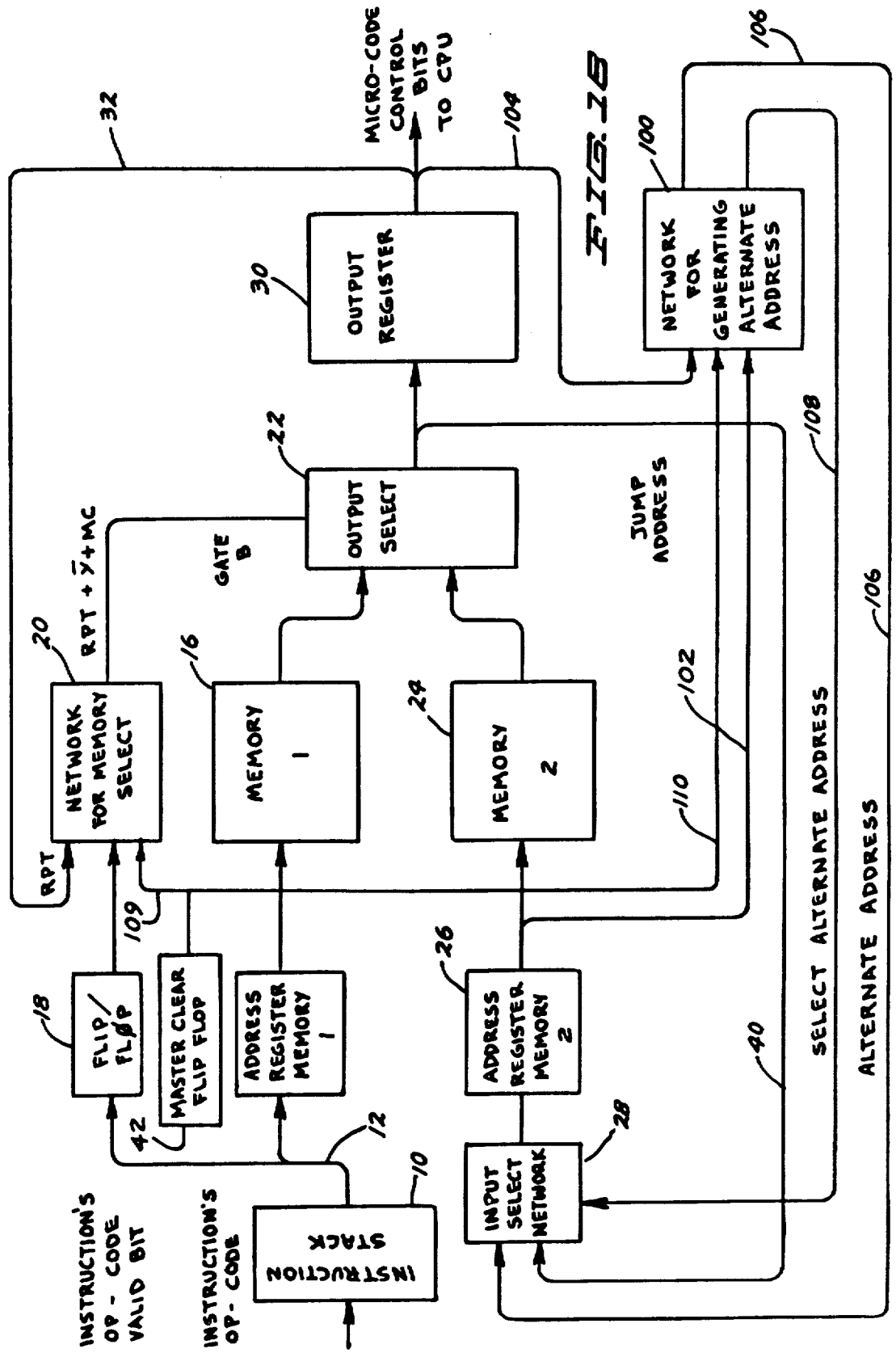

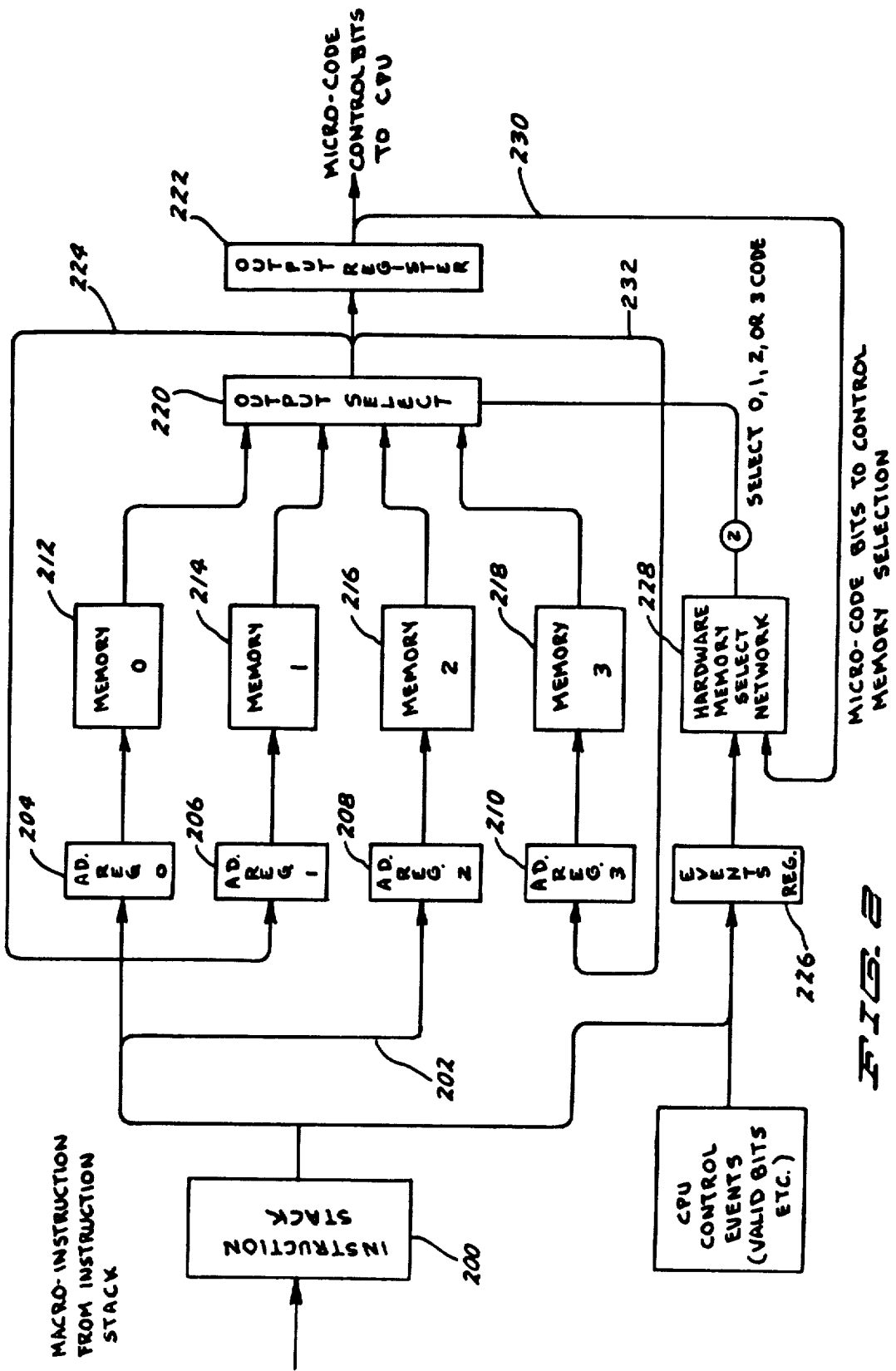

PLURAL MICROCODE CONTROL MEMORY

BACKGROUND OF THE INVENTION

This invention relates to microcode control memory for computer systems. This invention finds particular application to very high-speed computers where the instruction cycle time of the computer is very fast compared to the memory recall time of the memory devices in the microcode memory. In particular, this invention relates to a plural microcode memory where a first memory receives and executes initial instructions of multistep instructions and the entire instruction for single step instructions and in which a plurality of additional memories provide instruction execution for multistep instructions.

There is extensive art in the field of control functions for computer mainframes and for microcode control systems. Some patents known to applicant show various methods of speeding up or increasing the rate at which a microcode control memory may function. One patent in this field which appears relevant to the present application is U.S. Pat. No. 4,080,648. This patent shows a microprogram control system using two memories. The first microcode instruction is applied to a control register as soon as a first instruction is fetched. The second memory is used in performing certain functions in the system shown in that patent. However, it is believed that the disclosure of this application is distinct from that of the patent. The present invention relates to a fast output selection network scheme for all memories in a microcode control system so that the memory output to be selected is controlled by a separate select network at the same time that the memory is outputting the control bits in response to an input instruction so that these two functions occur at the same time. The technique results in not only the fastest possible method of memory select control but also in a design which allows each memory or pairs of memories to be independent from each other while sharing the same output select network and thus supplying control signals to the same central processer unit. This fast response of memory select to hardware stimuli and memory independence are necessary when utilizing microcode control in the design of a high-speed, pipelined computer. In this case, the microcode control unit must provide stop, start, issue and control of an instruction stream in a pipeline or parallel fashion.

SUMMARY OF THE INVENTION

This invention shows a microcode control memory having a first memory and at least one additional microcode memory. An instruction stack or some other appropriate system provides the initial instruction to the first memory along with a separate instruction code to a memory select network. While the first memory is producing an output from the input address, the memory select network is producing a selection code for an output selection network which receives the outputs from all memories. This output selection code determines that the output of the first memory will be selected for gating to the output register. All initial instructions of multistep instructions and all single step instructions are handled in the first memory and the memory select network gates the output from the first memory through to the output register. Succeeding steps of multistep instructions are gated to other memories or to a second memory where only two microcode memories are present. The output select network gates the output of the second or some other succeeding memory through to the output register at each operating cycle of the system. An advantage of this invention is that the memory output select function is occurring at the same time that an actual memory address function is occurring to produce output control bits. Thus, the memory does not need to find the output control bits as in the prior art, to determine which memory output will be gated to the output register. The decision on which memory output to be selected has occurred during the memory cycle time. This invention thus has the important advantage that the only limitation on control memory cycle time is the speed at which the microcode memories can produce an output from an input address. The further time required to decode the selected memory output does not need to be added to the memory cycle time. Thus machine cycle time can occur at a faster rate.

In the Figures:

FIG. 1A shows an embodiment of the present invention in block diagram form showing two memories in the system.

FIG. 1B shows a second embodiment of the present invention in block diagram form showing two memories in the system.

FIG. 2 shows a further embodiment of the present invention having a plurality of memories in the system.

DESCRIPTION OF THE PREFERRED EMBODIMENTS

Referring now to FIGS. 1A and 1B in which common reference numerals refer to common elements of the system, an instruction stack 10 is a source of instructions for the microcode control memory according to the present invention. These instructions are sometimes referred to as "op-code." The instruction stock produces a plurality of output bits to bus 12 which is connected to an address register 14 for the first microcode memory 16. A certain portion of the instructions on bits on bus 12 are conveyed to an input register 18 for the memory select work 20. In the case where only two microcode memories are present in the system this register 18 may consist of a flip-flop and be controlled by only a single "valid bit." The output from the first memory, memory 16 is gated to an output select network or switch 22. Also, gated to the output select network is the control signal generated by the network for memory selection 20. In the case of two memories as shown in FIGS. 1A and 1B the second memory, memory 24 is also gated to the output of memory 24 is gated to output select network 22. Memory 24 has an address register 26 comparable to address register 14 for the first memory. Address register 26 receives the input address from an input select network 28. Output select network 22 gates the output control bits from the memory system to an output register 30 which provides control bits to central processing units of the computer. In addition, output register 30 provides an input through a bus 32 to network for memory selection 20.

Referring now only to FIG. 1A output register 30 also provides a data bus 34 to convey a control function through bus 34 to input select network 28 for the second memory. This control function tells the input select network to select an incremented address for the next instruction in the multistep instruction. An address incrementer 36 receives the current address from the address register 26 and generates an incremented address which is conveyed by the output bus 38 to an input of the input select network 28. In the case where the multistep instruction does not require a simple increment of one in the microcode address, a jump address is provided as an output from output select network 22 and conveyed on bus 40 as an input to the input select network. In single step instructions and in the last instruction of multistep instructions, the jump address conveyed on bus 40 will be the first address of the Read Next Instruction (RNI) routine. This RNI routine will be exercised until the Gate B input to the output select network 22 is dropped and thus Memory 0 rather than Memory 1 will be selected to the output select network 22.

Referring now only to FIG. 1B, a more complicated address selection function can be performed using the present invention by using a network for generating an alternate address 100 instead of a simple address incrementing circuit. Network 100 receives the present address from the address register 26 through a bus 102. Network 100 also receives an output from the output register 30 through bus 104 and an output from the master clear flip/flop 42 through bus 110. The network for generating an alternate address generates an alternate address which is conveyed on bus 106 to an input for the input selection network 28 together with a control signal which is conveyed on bus 108 to input select network 28 to control the selection of alternate address produced in network 100. Bus 104 selects either the jump address 40 or the incremented address to be the alternate address as discussed in the previous description of FIG. 1A. However if the master clear flip/flop 42 is set as in this case of a master clear condition, bus 110 will automatically force the alternate address to be the first address of the master clear routine and any control from bus 104 will be overridden. In addition, if the master clear flip/flop 42 is set then this master clear condition will be conveyed through bus 109 to the network for memory select. This master clear condition alone will result in a set output from network for memory select 20 thus creating a GATE B signal to the output select 22. This is a necessary requirement on a master clear condition since the master clear routine is resident in the second memory, memory 24. Thus, a more complicated control in generating function for addresses may be performed by network 100 in addition to the usual function of incrementing the present address by one in order to proceed to the next instruction.

The operation of this system according to the present invention is based on a requirement to achieve the expected features of a microcode control memory without sacrificing any speed performance of the overall system because of the critical control functions. The ultimate goal is to maintain, using a microcode control memory system, a rate of function translation and central processor control bit generation equivalent to that achieved in a conventional hardware network system.

In conventional microcode memories, a microcode control word is fetched from control memory storage and is sent to control various events in the central processor. Since different microcode control words create different states of control function, any variation of the control function must be contained at the address sent to the microcode control memory. Thus, different addresses are used for different control states within the computer system. The conventional concept dictates that all control for variation of the address to control memory is to be done prior to the setting of the address in the address register.

This is especially true for the situation where the memory cycle time of the control system is defined as commencing with the setting of the address register 26 and ending with the setting of the output register for the control memory 30. Therefore, any creation of varianced the states of control must be done outside the control memory cycle.

If the particular design requirement is to modify the state of the control during only the memory cycle with events available at the beginning of the memory cycle, then those events cannot affect the input address to address register 26 by way of the input select network 28 to attain the desired modification of control state. Thus, the control state events which might be set in the event register or input network 18 cannot affect the input to the address register 26 from an input to the input selection network 28.

Thus an object of this invention is to solve this problem by allowing address register 26 to function directly to reference memory 24. However, a simultaneous reference is made to the microcode memory 16 which contains the alternate state of control as specified by address register 14 to achieve the variation in state of control. Thus, at the end of any memory cycle, after the first memory cycle, two different memories present alternate states of control to the output select network 22. In the present invention, then, output select network 22 selects the required control state to output register 30. An important feature of the invention is that the output selection network 22 is controlled by the hardware network 20 for memory selection which logically operates on events that are necessary for selection of the desired control state and which are available at the beginning of the memory cycle. Thus, the present control memory provides for overlap to occur between the processing time for the memory references and for the hardware memory select network 20. Thus, control state variation in response to processing control events can be contained within the memory cycle time.

As an example, the operation of the present invention as shown in FIGS. 1A and 1B will be described with respect to two different instructions from instruction stack 10. The first instruction will be an instruction which requires two steps of processing, the first from memory 16 and the second from memory 24. Only the first instruction of a sequence of instructions occurs using memory 16 so all succeeding instructions in a set of instructions will occur using memory 24. Assume an initial state of this system in which only one instruction is present in the instruction stack and in which the valid bit input into event register 18 is clear and in which event register or flip-flop 18 is clear. The input to memory select network 20 will receive a clear input from flip-flop or event register 18 and because of this network 20 will have a set output which is not dependent upon the repeat signal gated on bus 32 from output register 30.

Since an initially clear condition is assumed, the repeat signal will be clear because the function being performed in memory 24 will be a read next instruction sequence. The system is designed so that the output of memory 24 is always elected unless the network for memory select causes the output select network 22 to select the output from memory 16 for gating to the output register. Thus, the initial state of the system will be that a gate B signal will be input to output select network 22 from the network for memory selection 22 so that the output from memory 16 is selected.

Assume that the valid bit is entered into event register 18 as the instruction from the information stack is gated to address register 14. Then, the Y input to the network from memory selection 20 becomes set. Network 20 will then have an output which is a function of the repeat signal on bus 32. The repeat signal on bus 32 is clear because of the read next instruction function being performed. Thus, since the repeat bus is clear the gate B signal an output selected network 22 will become clear so that memory 16 becomes the memory having the output selected by select network 22 for transmission to output register 30. This function is occurring at the same time as memory 16 is receiving the new address from memory 14 and fetching the output control state code bits. Since it is assumed for this example that the initial instruction from the instruction stack requires two steps for operation, the second step of operation must occur through a reference to memory 24 after the reference to memory 16.

This occurs as a result of having the repeat microcode bit in a set condition in the microcode control instruction referenced from memory 16 and pass through the output select network 22 and the output register 30 to bus 32 as an input to network 20. Thus, this repeat bit will be set in output register 30 at the end of the first microcode instruction memory cycle. It can then be used as an input to the network for memory select 20 on the subsequent operating cycle thus making the gate B signal at the output select network 22 occur to select memory 24 through the output select network 22 on the second microcode instruction. The location in memory 24 which is referenced is determined by the jump address which is also included in the first instruction of the sequence received from the instruction stack.

Because this example shows only two instructions in the sequence, the second and last instruction will have the repeat bit cleared. Now assume that the next instruction is removed from the instruction stack on bus 12 because it will have a valid bit as an input to event register 18. Thus, a gate B signal will be presented to the output select network for the network from memory selection 20. The second instruction from the instruction stack will then reference the microcode instruction in memory 16. It is assumed that this second instruction from the instruction stack only requires a single microcode instruction and it will thus contain a clear repeat bit to be gated from output register 30 so that gate B will not be gated into the output select network 22.

Assume, for example, that another instruction in the instruction stack is gated through bus 12 to the address register. This sample instruction can require a sequence of 15 microcode instructions for full operation. In this case, the repeat bit on bus 32 would be set not only in the first micro instruction coming from memory 16 but also in each of the subsequent instructions in memory 24 except for the last of the sequence. Thus the repeat bit would be set in the first 14 instructions and cleared at the last instruction to control the performance of the particular instruction from the instruction stack.

Referring now to FIG. 2, a plural memory microcode control system is shown in which four memories illustrate the various control states that may be achieved using more than one memory together with a hardware memory select network. As in the other embodiments of the invention previously described, an instruction stack 200 conveys instructions to the microcode control memory through a bus 202. Bus 202 is connected to address registers for controlling the microcode memories. Four address registers 204, 206, 208 and 210 are provided. Microcode memories 212, 214, 216 and 218 are associated respectively with the address registers 204, 206, 208 and 210. However, only address registers 204, 208 and 210 receive instruction addresses from the instruction stack 200 on data bus 202. All four memories have their output connected to an output select network 220. Output select network is connected to an output register 222 and gates the selected output to the output register at the appropriate time. Data bus 224 is connected from the output select network to an input to address register 206 so that memory 214 which receives addresses from address register 206 only receives address input which have been provided as an output of the output select network 220. Similarly, data bus 232 is connected from the output select network to an input to address register 210. Various central processor control events and, for example, a valid bit from the instruction stack is provided as an input to an event register 226 which has a plurality of bits as determined by the requirements of the system. Event register 226 is connected as an input to a hardware memory select network 228 which decodes the input from the event register 226 to provide a control signal to the output select network 220 for selecting the appropriate memory. In addition, a data bus 230 from output register 222 is connected as an input to the hardware select network 228 to provide additional control functions over which memory output is selected by select network 220.

Thus FIG. 2 illustrates an embodiment of the invention in which the concept of running two independent microcode memories may be extended to a microcode system of a plurality of memories. Each memory would be responsible for presenting one of the alternatives of microcode control state. The most important factor in this design approach is the number of memories to be used. In the embodiment of the invention shown in FIGS. 1A and 1B, two memories were used because of two design considerations. The first was that two simultaneous activities must be in operation, namely, the decode of an input instruction from the instructions stack and the repeat function. The other consideration is a function of the current state of the art for microcode control memories cycle time. The memory can only be designed within the state of the art for what the cycle time is. For example, in the embodiment shown in FIGS. 1A and 1B, the memory cycle time for the microcode memories was approximately two-thirds of the machine cycle time to access and develop an output. Thus, only one-third of the machine cycle time was left for output selection and other hardware network functions.

Now for example, if the microcode memory reference time were to be only approximately one-half of the machine cycle time and assuming that microcode memory circuit density is increased, then a microcode memory control system using four memories can easily be accomplished. As an example of the function of a four-microcode memory system shown in FIG. 2, the first two memories 212 and 214 may be used to function in a fashion generally analogous to the two memories shown in FIGS. 1A and 1B almost as if memories 216 and 218 were not present. Thus, memories 216 and 218 may be used to provide additional functions while memories 212 and 214 will function generally as previously described in the two-memory system with the memory 212 receiving the initial instruction in multistep instructions and the instruction in single step instruction while memory 214 receives succeeding instructions in multistep instructions. Thus, for example, memories 216 and 218 might be used to contain a prior revision of the microcode presently contained in memory 212. That is, the same computer system could be used to update old versions of the same microcode instruction set depending upon which version the user had programs for merely by selecting using a hardware network the version desired. Thus, a particular revision level for the microcode program might be selected for each different user of the computer system without affecting the other users and without having to have separate input functions for downtime for changing the memory version in which the computer functions.

Another application of the multiple memory technique shown in FIG. 2 is the ability to retain and execute microcode diagnostic programs in memories 216 and 218. For example, if the instruction stack valid bit is not set as received by the event register 226 then there are no Instruction Stack 200 instructions for memories 212 and 214 to execute. The hardware memory select network 228 would detect this not valid condition as relayed via the event register 226. The hardware memory select network 228 would thus disable memories 212 and 214 at the output select network 220 and enable memories 216 and 218 for execution of the resident microcode diagnostic programs. Upon occurrence of a valid condition in the instruction stack, hardware memory select network would enable memories 212 and 214 for instruction execution and disable memories 216 and 218 from microcode diagnostic execution at output select 220. The important advantage of this concept is that even if no instructions are available for execution, the time normally spent awaiting these instructions would be constructively used in execution for a microcode diagnostic of the CPU.

A third possible application of four microcode memories would be for memories 212 and 214 to contain microcode for emulation of a particular machine language instruction set. Then, memories 216 and 218 would contain microcode in support of a different machine language instruction set. Again, the hardware memory select network 228 would determine which pair of memories would be selected at the output select 220. This selection would be made as a result of a condition in the event register 226 which would arise within the instruction stack 200. Thus by execution of a particular instruction within the instruction stack 200, selection of one of two different sets of emulation microcode may be called out from memory. Likewise, a subsequent instruction released from the instruction stack would select the alternate emulation microcode. An additional advantage of this implementation is the fact that memories 212 and 214 are physically independent from memories 216 and 218. This means that the logic means in support of memory 212 and 214 in pursuit of its emulation tasks could be custom designed for the instruction set being emulated. This affords greater efficiency of design in that special considerations could be made for each instruction set being emulated. This is important since different machine language instruction sets may vary greatly in their structure and design.

What is claimed is:

1. A data processing microcode control memory system, said microcode control memory system adapted to provide computer control signals in a computer and said microcode control memory system adapted to operate through a plurality of memory cycles of operation, comprising,
    means for providing input instructions to the microcode control memory system,
    a first microcode memory connected to said means for providing input instructions for producing first output memory and computer control signals in response to said input instructions,
    a second microcode memory for producing second output memory and computer control signals in response to instructions at the same time as said first microcode memory is producing said first output memory and computer control signals,
    a first address register receiving as its input an input instruction from said means for providing input instructions, the output of said first address register being connected to the input of said first microcode memory,
    a second address register the output being connected to the input of said second microcode memory,
    an event register receiving an input from said means for providing input instructions,
    output select means for selecting between the output computer and memory control signals of said first and second microcode memories as the output of said system, said output select means connected to receive output computer and memory control signals from the outputs of said first and second microcode memories, said output select means determining which microcode memory output of said first and second microcode memories to select as providing the output computer and memory control signals of said system at the same time as said first and second microcode memories are producing said first and second output computer and memory control signals, said output select means also selecting between one of two input condition signals one of which is a repeat control signal received from an output memory control signal of the next preceding memory cycle of said system and the second input of which is a signal received from said event register and
    means for storing output memory control signals from the next preceding memory cycle connected with said output select means to provide said repeat signal to said output select means and to provide output computer control signals of said microcode control memory system.

2. The system of claim 1 and further comprising,
    input select network means receiving a first input memory control signal from the output select network means and a second input from an alternate address select network, and having an output connected to said second address register, and including
    means for selecting which of said inputs said second address register receives and having as a control input at least one bit from the output of said system from the next preceding memory cycle of said system from said means for storing output signals, the state of the control input determining which input is selected.

3. The system of claim 2 wherein said alternate address select network is an address increment network.

4. A plural microcode memory control system, said memory control system adapted to provide control signals in a computer and said memory control system adapted to operate through a plurality of memory cycles of operation, comprising,
- means for providing instructions,
- first memory connected to receive instructions from said means for providing instructions and to provide a first control signal output,
- at least one additional memory to provide at least one additional control signal output at the same time as said first memory is providing said first control signal output,
- an output select network connected to receive the first control signal output of said first memory and the control signal output of all of said additional memories and having an output which is connected to the input of at least one of said additional memories,
- an output register for receiving the output from the output select network, and
- memory select networks for receiving input event control bits and for providing an output control signal, said input event control bits being compared with predetermined possible combinations and causing a particular output control signal to be sent that corresponds to the compared input event control bits for the particular combination of input event control bits received by the memory select network for controlling the output select network to select the output of a particular memory to be gated to the output register at the same time as said first and said additonal memories are producing control outputs.

5. The system of claim 4 and further comprising an alternate address select network and an input select network means connected to at least one of said additional memories,
- said input select network receiving a first input from a selected portion of the output select network and a second input from said alternate address select network, and
- said input select network including logic means for selecting which of said inputs said memories uses and having as a control input one input from the output select network which controls the selecting process by matching said input with preselected conditions for memory selection.

* * * * *